Figure 5:
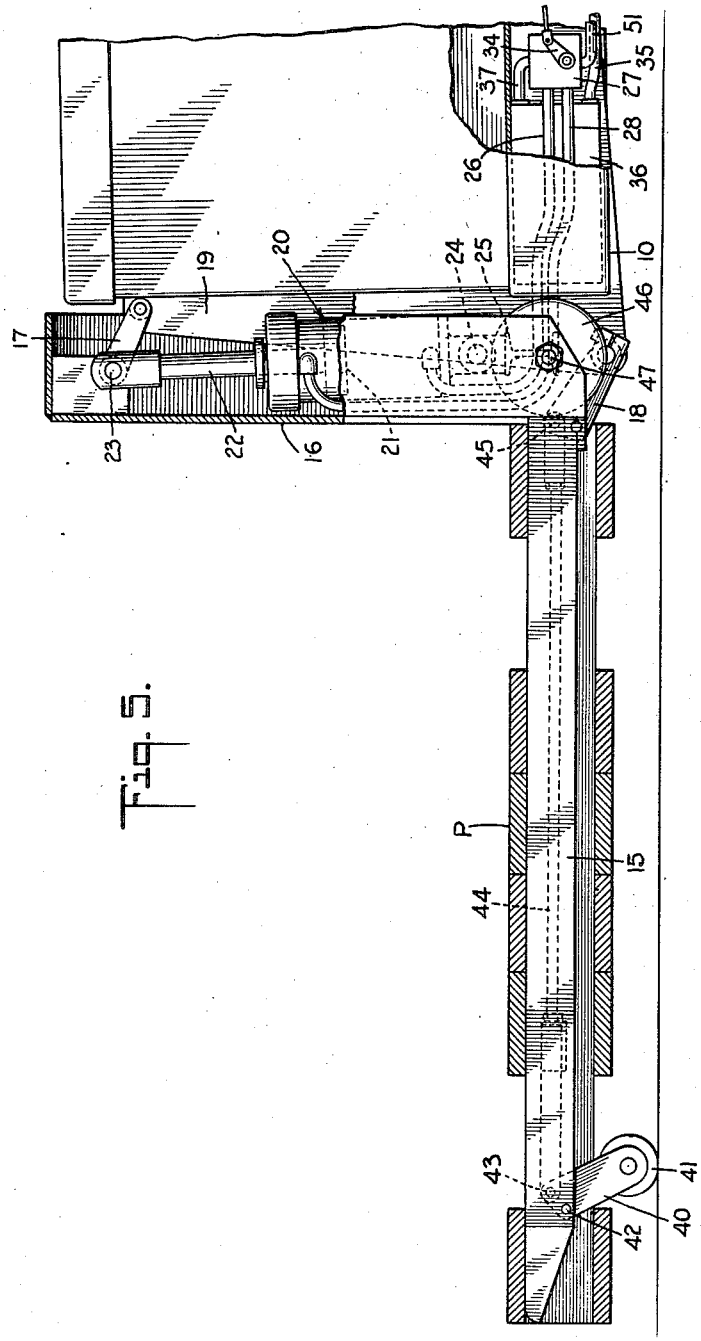

July 17, 1951
G. F. QUAYLE
2,560,819
LIFT TRUCK
Filed Dec. 13, 1947
3 Sheets-Sheet 1
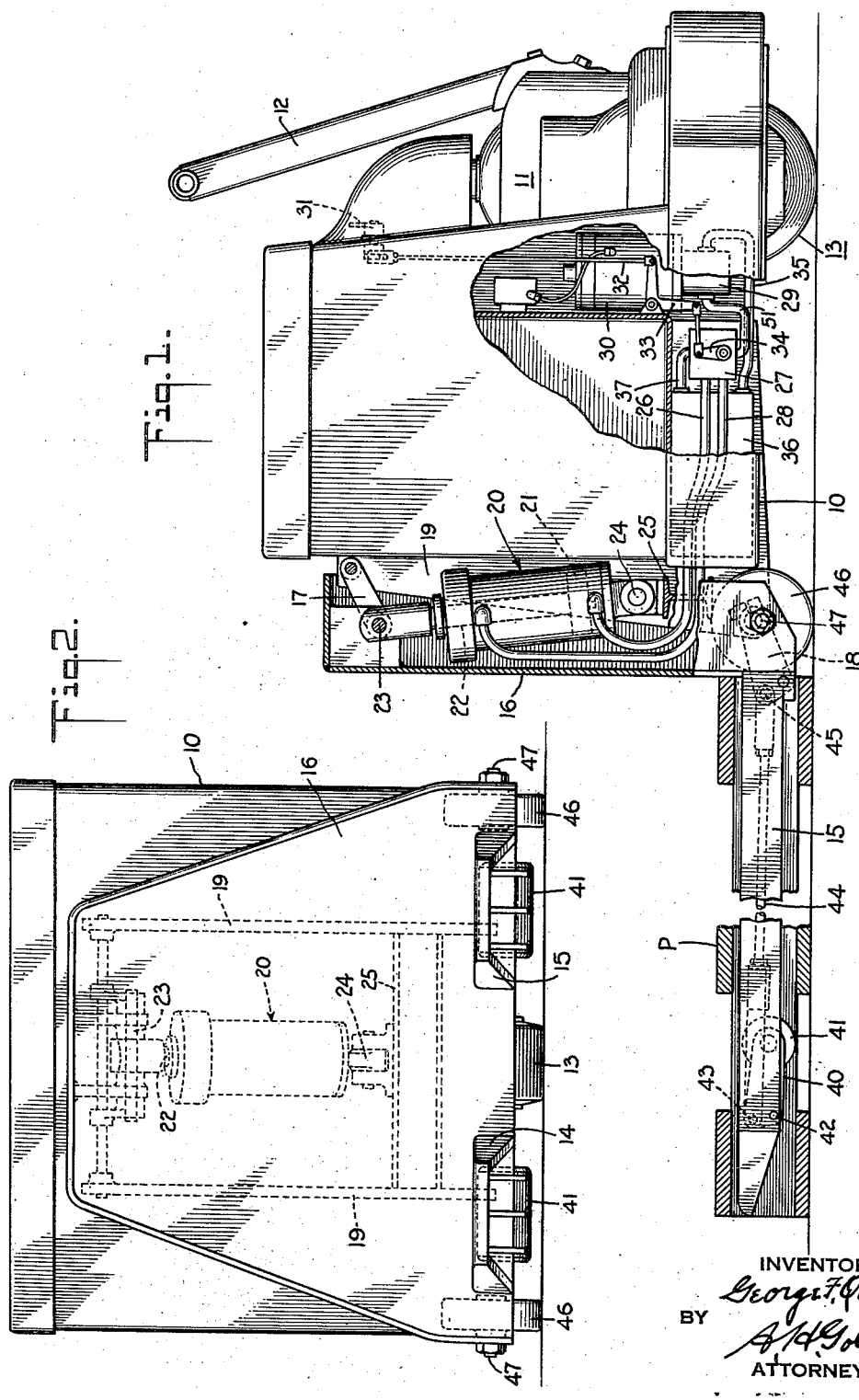
INVENTOR
George F. Quayle
BY
A. H. Golden
ATTORNEY July 17, 1951  G. F. QUAYLE  2,560,819
LIFT TRUCK
Filed Dec. 13, 1947  3 Sheets-Sheet 2
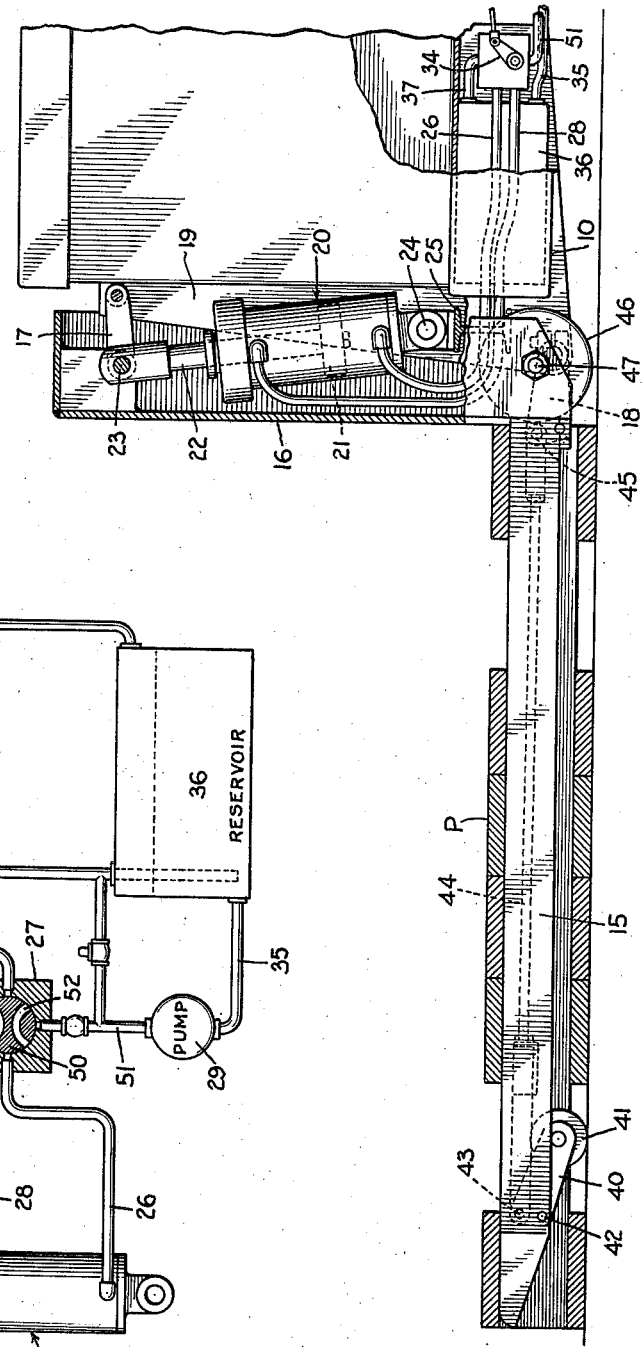
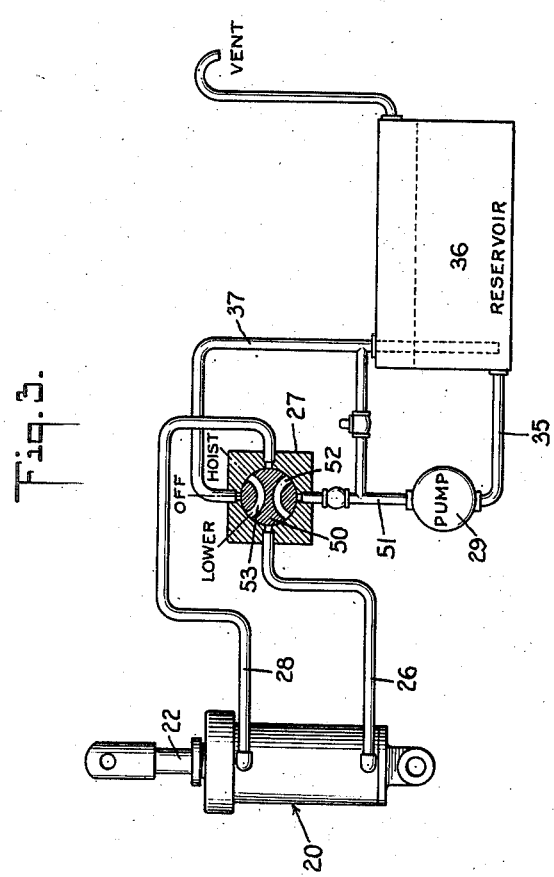
INVENTOR
George F. Quayle
BY
J. H. Golden
ATTORNEY July 17, 1951 G. F. QUAYLE 2,560,819
LIFT TRUCK
Filed Dec. 13, 1947 3 Sheets-Sheet 3

INVENTOR
George F. Quayle
BY
A. H. Golden
ATTORNEY

Patented July 17, 1951

2,560,819

UNITED STATES PATENT OFFICE 2,560,819

LIFT TRUCK

George F. Quayle, Philadelphia, Pa., assignor to The Yale & Towne Manufacturing Company, Stamford, Conn., a corporation of Connecticut Application December 13, 1947, Serial No. 791,507

6 Claims. (Cl. 254—2)

This invention relates to an industrial truck of the type in which an elevating platform is adapted to be raised relatively to a main frame or lifting head. More particularly, this invention relates to a truck of the particular class described and claimed by Framhein in his patents, No. 2,415,090, No. 2,417,394, and No. 2,417,395.

In the Framhein patents there is disclosed a truck particularly adapted for utilization with a skid of the pallet type; that is, a skid having upper and lower floors between which the elevating platform of the truck is adapted to enter. After entering between the floors of the pallet, the elevating platform is elevated and thus raises the pallet. Framhein points out that trucks of the particular class usually have an elevating platform supported by rear lifting wheels that are preferably pivotally mounted relatively to the platform. When the lifting wheels are moved on their mounting means relatively to the platform, they act to raise the platform. In actual operation, trucks of the particular type are manipulated so that the platform and the lifting wheels are positioned between the upper and lower floors of the pallet and with the lifting wheels placed between certain of the boards of the pallet. Thereafter, when the lifting wheels are moved on their mounting means relatively to the elevating platform of the truck, both the platform and pallet are elevated, the wheels resting against the ground in the space between two of the boards of the pallet.

As Framhein points out further in his patents, it is extremely difficult to move the elevating platform of a truck of the class described into and out of its position between the floors of a pallet. This is true because the lifting wheels must move upwardly each time one of the floor boards of the pallet is encountered. It is for that reason that the truck art adopted rollers to assist the wheels of a truck of the particular type in moving upwardly each time a pallet floor board is encountered. Framhein advanced the art rather considerably by employing intermediate wheels for supporting the entire truck for movement while at the same time, the usual lifting wheels of the platform are maintained upwardly and in a position spaced from the ground. Thus, in Patent No. 2,415,090, intermediate wheels are mounted on the lifting head and are adapted to be moved against the ground at the same time that the lifting wheels pivoted to the elevating platform are moved upwardly away from the ground. In Patent No. 2,417,394 Framhein employs intermediate wheels that are mounted on axes fixed relatively to the elevating platform. His arrangement is such that when the elevating platform is lowered to bring the intermediate wheels in contact with the ground, the lifting wheels are raised off the ground. My invention is best understood by a comparison thereof with this second Framhein patent, and also with his Patent No. 2,417,395.

In Framhein, the lifting of the elevating platform is accomplished by a hydraulic ram, while the lowering of the platform is accomplished by gravity, with springs being utilized to bring the elevating platform into its fully lowered position, and for maintaining the lifting wheels off the ground. I have conceived and developed a construction whereby the lifting wheels are positively maintained off the ground through power means such as a hydraulic ram, with the hydraulic ram being preferably, but not necessarily, the same ram that is utilized for elevating the platform.

Thus, as a feature of my invention, I contribute a truck of the class described in which positive means are utilized for elevating the platform through the downward movement of the lifting wheels, the intermediate wheels that normally support the truck then being raised off the ground. Reversely, the elevating platform may be lowered by positive means to bring the intermediate wheels against the ground while raising the lifting wheels off the ground. Naturally, with the lifting wheels off the ground, the truck may be manipulated relatively to a pallet to contribute the results sought by this art.

I have thus outlined the general nature of my invention and its relation to the prior art in order that the description thereof that follows may be better understood, and in order that my contribution to the art may be better appreciated. There are, of course, additional features of my invention that will be described hereinafter and which will form the subject of the claims appended hereto. Those skilled in the art will appreciate that the conception on which my disclosure is based, may readily be utilized as the basis for the designing of other structures for carrying out the several purposes of my invention. It is important, therefore, that the claims to be granted me shall be of sufficient breadth to prevent the appropriation of my invention by those skilled in the art.

Referring now to the drawings, Fig. 1 is an elevation and partial section of the truck of my invention, showing the elevating platform lowered and inserted between the upper and lower floors of a pallet. Fig. 2 is an end view of the truck looking from the rear of the truck forwardly. Fig. 3 is a diagrammatic showing of the hydraulic lifting and lowering system. Fig. 4 is a view of certain of the parts of Fig. 1, but illustrating the elevating platform lifted partially off the ground. Fig. 5 shows the elevating platform in its fully lifted position.

Referring now more particularly to the drawings, the truck of my invention embodies what I term a lifting head 10 having pivoted at its forward end a steering head 11 equipped with a steering handle 12. The particular truck is of the motorized type shown well in the Schroeder Patent No. 2,399,605 and in the Framhein Patent No. 2,327,583, in which the forward steering wheel 13 is not only moved with the steering head 11 by the steering handle 12, but is also power rotated to propel the truck forwardly and rearwardly.

The elevating platform of the truck is of that usual type known as a U frame elevating platform, and is equipped with legs 14 and 15 extending rearwardly from a forward standard 16. This forward standard 16 is pivoted through upper links 17 and lower links 18 to the lifting head 10, the said lifting head 10 having a rear standard 19 for the particular purpose. Through the arrangement set forth, it is obvious that when lifting pressure is applied to the elevating platform, it will move on the links 17 and 18 in an upward direction relatively to the lifting head 10.

For imparting movement to the elevating platform, I utilize a lifting ram assembly 20 having therein a piston 21 secured to a rod 22 that is pivoted at 23 to an integral portion of the standard 16 of the elevating platform. The cylinder of the ram assembly 20 is itself pivoted at 24 to a bracket 25 integral with the lifting head 10. It is, of course, obvious now that movement of the piston 21 and its rod 22 relatively to the ram assembly 20 will effect the upward and downward movement of the elevating platform on the links 17 and 18.

For actuating the ram assembly 20, I utilize certain parts now to be described, and which are shown mechanically in Figs. 1, 4, and 5. The parts are best understood, however, from reference to the diagrammatic view thereof in Fig. 3. Thus, the lower end of the ram cylinder is connected by a pipe 26 to a valve casing 27, while the upper end of the ram cylinder is connected by a pipe 28 to the valve casing 27. A pump 29 is actuated by an electric motor 30 under the control of suitable switching mechanism 31, this switching mechanism operating also through a rod 32 and a bell crank 33 to effect the movement of a control lever 34 adapted to position the valve mechanism within the casing 27. Pump 29 is connected by a pipe 35 to the reservoir 36, the reservoir 36 being in turn connected by a pipe 37 to the valve casing 27. I shall later describe in detail just how the mechanism thus outlined operates.

Each leg 14, 15 of the elevating platform has pivoted thereto at 42 a link 40 on which rotates a lifting wheel 41. At 43 there is pivoted to each of the links 40 a composite rod 44 that extends forwardly of the elevating platform and is pivoted at 45 to one of the links 18. Through this arrangement, the pivotal movement of the links 18 incidental to the pivotal movement of the elevating platform on the links 17, 18 effects the swinging movement of the links 40 together with the wheels 41.

Rotatable on the forward end of the elevating platform at each side thereof, is what I term an intermediate wheel 46 mounted on a shaft 47. Because of this relationship of the wheels 46 to the elevating platform, it is obvious that the said wheels will move with the platform in its upward and downward swinging movement relatively to the lifting head 10.

It is important to indicate at this time, that the mounting of the elevating platform of the truck relatively to the lifting head for upward and downward movement, is per se old and well-known in this art. Similarly, the use of the lifting wheel links 40 and the lifting wheels 41, and their movement incidental to the upward movement of the elevating platform is also old. It is old furthermore, as I have already indicated, to mount on the forward end of the elevating platform, intermediate wheels such as the wheels 46. My invention resides basically in the conception of the utilization of means for imparting upward movement to the elevating platform and also downward movement to the elevating platform whereby to bring the wheels 46 against the ground and to maintain the wheels 41 and the links 40 upwardly in a position to hold the wheels 41 away from the ground, thereby obviating the need for the cumbersome and expensive springs of the prior art, and the need for compressing the springs while lifting a load.

Referring now more particularly to Fig. 1, it will be noted that the wheels 46 are against the ground, while the lifting wheels 41 are off the ground. Because of this relationship of the parts, it is obvious that the elevating platform, including the legs 14, 15, may be inserted without difficulty between the upper and lower floors of the pallet P or moved outwardly from the pallet. The particular position of the elevating platform relatively to the lifting head 10 is maintained through the utilization of the piston 21 and the piston rod 22 of the ram assembly 20. Thus, the piston 21 is held in the position illustrated in Fig. 1 by the hydraulic pressure originally asserted thereagainst through operation of the pump 29, and now maintained by the setting of valve body 50, to which reference will be made shortly.

Let us assume it is now desired to lift the pallet P by operation of the elevating platform. The operator will move the handle 31 whereby to operate the valve mechanism within the casing 27. Th operation at this point will require a rotation of the valve body 50 in Fig. 3 in a clockwise direction to the lift position. At the same time, the motor 30 will be energized and the pump 29 operated. The pump 29 will accept fluid from the reservoir 36 through the pipe 35 and will force the fluid under pressure through the pipe 51, passage 52 of valve body 50, and then through pipe 26 to the bottom of the cylinder of the ram assembly 20. Fluid from above the ram will move through pipe 28 to reservoir 36 through valve passage 53. This will effect the upward movement of the piston 21 from the position of Fig. 1 to the position of Fig. 4. Obviously, this action of the piston 21 will effect an upward swinging movement of the elevating platform standard 16 on the links 17 and 18 to the position of Fig. 4, and will cause the wheels 46 to move upwardly off the ground. At the same time, the pivotal swinging movement of the links 18 will effect a downward swinging of the lifting wheel links 40 to bring the lifting wheels 41 against the ground. The elevating platform has now been lifted to contact the upper boards of the pallet P.

If it is now desired to raise the elevating platform more fully, the motor 30 is allowed to remain energized, and the pump moves the piston 21 to its full upward position illustrated in Fig. 5. The elevating platform is now fully raised and it will be noted that the wheels 46 are spaced from the ground a considerable distance. Of course, my hydraulic system will embody the usual check and safety valves, but these are here not shown, as they per se, form no part of the invention.

If it is now wished to lower the elevating platform to the position of Fig. 1 and to withdraw the truck from between the floor boards of the pallet, the direction of rotation of the motor is reversed, and simultaneously the valve body 50 is rotated counter-clockwise to its lowering position, bringing the passage 52 into position between the pipe 28 and the pipe 51. Motor 30 will now rotate the pump 29 to take fluid from the pipe 35 into the pipe 51 and thence through passage 52 into the pipe 28. The hydraulic pressure thus introduced into the cylinder will force the piston downwardly slowly to its position of Fig. 1. During this movement, the wheels 41 will be raised off the ground and the intermediate wheels 46 will be lowered against the ground to support the truck. Of course, in the particular position of Fig. 1 the elevating platform is maintained as illustrated by the hydraulic pressure in the system through valve 50 after the shutting off of the motor 30 and the operation of the pump 29. It will thus be seen that the elevating platform is always brought to and maintained in each of its positions by hydraulic pressure through the operation of the hydraulic ram assembly 20. Through the arrangement set forth, it is unnecessary to utilize the springs required by the prior art, and it is further unnecessary to compress the springs each time the elevating platform is raised, thereby decreasing the amount of work that must be done.

I believe that those skilled in the art will now fully appreciate the advantages of my contribution to this art.

I now claim:

1. In a truck of the class described, a lifting head, an elevating platform, means mounting said elevating platform for lifting movement relatively to said lifting head, lifting wheels movably mounted on said elevating platform, hydraulic ram means movable in opposed directions into two extreme end positions, means whereby said hydraulic ram means when actuated in one direction move said lifting wheels away from said elevating platform to lift said elevating platform relatively to the ground, said hydraulic ram means when actuated in a reverse direction moving said lifting wheels toward said platform whereby to lower said platform relatively to the ground, intermediate wheels on said elevating platform movable upwardly and downwardly with said elevating platform, a forward wheel supporting said lifting head, said hydraulic ram means moving to one of said extreme end positions for holding said platform in a full downward position with said intermediate wheels touching the ground whereby said intermediate wheels and said forward wheel support said elevating platform and lifting head on the ground, said lifting wheels being then held by said hydraulic ram means off the ground with the lowermost portions of their peripheries above corresponding portions of the peripheries of said intermediate wheels, said hydraulic ram means moving to the said opposed extreme end position for lowering said lifting wheels downwardly against the ground away from said elevating platform and thereby effecting the lifting of the elevating platform together with said intermediate wheels whereby then to support said elevating platform and lifting head on said lifting wheels and said forward wheel.

2. In a truck of the class described, a lifting head, an elevating platform, means mounting said elevating platform for lifting movement relatively to said lifting head, lifting wheels movably mounted on said elevating platform, hydraulic ram means movable in opposed directions into two extreme end positions, means whereby said hydraulic ram means when actuated in one direction move said lifting wheels away from said elevating platform to lift said elevating platform relatively to the ground, said hydraulic ram means when actuated in a reverse direction moving said lifting wheels toward said platform whereby to lower said platform relatively to the ground, intermediate wheels on said elevating platform movable upwardly and downwardly with said elevating platform, a forward wheel supporting said lifting head, said hydraulic ram means moving to one of said extreme end positions for holding said platform in a full downward position with said intermediate wheels touching the ground whereby said intermediate wheels and said forward wheel support said elevating platform and lifting head on the ground, said lifting wheels being then held by said hydraulic ram means off the ground with the lowermost portions of their peripheries above corresponding portions of the peripheries of said intermediate wheels, said hydraulic ram means moving to the said opposed extreme end position for lowering said lifting wheels downwardly against the ground away from said elevating platform and thereby effecting the lifting of the elevating platform together with said intermediate wheels whereby then to support said elevating platform and lifting head on said lifting wheels and said forward wheel, said hydraulic ram means when in a position intermediate said two end positions holding said platform with both its intermediate wheels and said lifting wheels in engagement with the ground.

3. In a truck of the class described, a lifting head, an elevating platform, parallel links connecting the forward end of said elevating platform to said lifting head for lifting movement relatively to said lifting head, lifting wheels movably mounted at the rear of said elevating platform, hydraulic ram means movable in opposed directions into two extreme end positions, means whereby said hydraulic ram means when actuated in one direction moves the forward end of said elevating platform upwardly relatively to said lifting head on said links and also moves said lifting wheels away from said elevating platform whereby to lift said elevating platform, said hydraulic ram means when actuated in a reverse direction moving the forward end of said elevating platform downwardly relatively to said lifting head while moving said lifting wheels toward said platform whereby to lower said platform, intermediate wheels on said elevating platform movable upwardly and downwardly with said elevating platform, a forward wheel supporting said lifting head, said hydraulic ram means moving to one of said extreme end positions for holding said platform in a full downward position with said intermediate wheels touching the ground whereby said intermediate wheels and said forward wheel support said elevating platform and lifting head on the ground, said lifting wheels being then held simultaneously by said hydraulic ram means off the ground with the lowermost portions of their peripheries above corresponding portions of the peripheries of said intermediate wheels, said hydraulic ram means moving to the said opposed extreme end position for lowering said lifting wheels downwardly against the ground away from said elevating platform and thereby effecting the lifting of the elevating platform together with said intermediate wheels whereby then to support said elevating platform and lifting head on said lifting wheels and said forward wheel.

4. In a truck of the class described, a lifting head, an elevating platform, parallel links connecting the forward end of said elevating platform to said lifting head for lifting movement relatively to said lifting head, lifting wheels movably mounted at the rear of said elevating platform, a hydraulic ram extending between said elevating platform and said lifting head and with the piston thereof movable in opposed directions into two extreme end positions, means whereby the piston of said hydraulic ram when actuated in one direction moves the forward end of said elevating platform upwardly relatively to said lifting head on said links and also moves said lifting wheels away from said elevating platform whereby to lift said elevating platform, the piston of said hydraulic ram when actuated in a reverse direction moving the forward end of said elevating platform downwardly relatively to said lifting head while moving said lifting wheels toward said platform whereby to lower said platform, intermediate wheels on said elevating platform movable upwardly and downwardly with said elevating platform, a forward wheel supporting said lifting head, the piston of said hydraulic ram moving to one of said extreme end positions for holding said platform in a full downward position with said intermediate wheels touching the ground whereby said intermediate wheels and said forward wheel support said elevating platform and lifting head on the ground, said lifting wheels being then held simultaneously by said hydraulic ram means off the ground with the lowermost portions of their peripheries above corresponding portions of the peripheries of said intermediate wheels, the piston of said hydraulic ram moving to the said opposed extreme end position for lowering said lifting wheels downwardly against the ground away from said elevating platform and thereby effecting the lifting of the elevating platform together with said intermediate wheels whereby then to support said elevating platform and lifting head on said lifting wheels and said forward wheel.

5. In a truck of the class described, a lifting head, an elevating platform, means mounting the forward end of said elevating platform on said lifting head for lifting movement relatively to said lifting head, lifting wheels movably mounted at the rear of said elevating platform, hydraulic ram means movable in opposed directions into two extreme end positions, means whereby said hydraulic ram means when actuated in one direction move the forward end of said elevating platform upwardly relatively to said lifting head and also move said lifting wheels away from said elevating platform whereby to lift said elevating platform, said hydraulic ram means when actuated in a reverse direction moving the forward end of said elevating platform downwardly relatively to said lifting head while moving said lifting wheels toward said platform whereby to lower said platform relatively to the ground, intermediate wheels on said elevating platform movable upwardly and downwardly with said elevating platform, a forward wheel supporting said lifting head, said hydraulic ram means moving to one of said extreme end positions for holding said platform in a full downward position with said intermediate wheels touching the ground whereby said intermediate wheels and said forward wheel support said elevating platform and lifting head on the ground, said lifting wheels being then held simultaneously by said hydraulic ram means off the ground with the lowermost portions of their peripheries above corresponding portions of the peripheries of said intermediate wheels, said hydraulic ram means moving to the said opposed extreme end position for lowering said lifting wheels downwardly against the ground away from said elevating platform and thereby effecting the lifting of the elevating platform together with said intermediate wheels whereby then to support said elevating platform and lifting head on said lifting wheels and said forward wheel.

6. In a truck of the class described, a lifting head, an elevating platform, parallel links connecting the forward end of said elevating platform to said lifting head for lifting movement relatively to said lifting head, lifting wheels movably mounted at the rear of said elevating platform, a hydraulic ram extending between said elevating platform and said lifting head and with the piston thereof movable in opposed directions into two extreme end positions, means whereby the piston of said hydraulic ram when actuated in one direction moves the forward end of said elevating platform upwardly relatively to said lifting head on said links and also moves said lifting wheels away from said elevating platform whereby to lift said elevating platform, the piston of said hydraulic ram when actuated in a reverse direction moving the forward end of said elevating platform downwardly relatively to said lifting head while moving said lifting wheels toward said platform whereby to lower said platform, intermediate wheels on said elevating platform movable upwardly and downwardly with said elevating platform, a forward wheel supporting said lifting head, the piston of said hydraulic ram moving to one of said extreme end positions for holding said platform in a full downward position with said intermediate wheels touching the ground whereby said intermediate wheels and said forward wheel support said elevating platform and lifting head on the ground, said lifting wheels being then held simultaneously by said hydraulic ram means off the ground with the lowermost portions of their peripheries above corresponding portions of the peripheries of said intermediate wheels, the piston of said hydraulic ram moving to the said opposed extreme end position for lowering said lifting wheels downwardly against the ground away from said elevating platform and thereby effecting the lifting of the elevating platform together with said intermediate wheels whereby then to support said elevating platform and lifting head on said lifting wheels and said forward wheel, the piston of said hydraulic ram when in a position intermediate said two end positions holding said platform with both its intermediate wheels and said lifting wheels in engagement with the ground.

GEORGE F. QUAYLE.

REFERENCES CITED

The following references are of record in the file of this patent:

UNITED STATES PATENTS

| Number | Name | Date |
| --- | --- | --- |
| 2,366,378 | Barrett | Jan. 2, 1945 |
| 2,417,396 | Framhein | Mar. 11, 1947 |
| 2,423,703 | Henderson | July 8, 1947 |